US011370552B2

(12) United States Patent
Carter et al.

(10) Patent No.: US 11,370,552 B2
(45) Date of Patent: Jun. 28, 2022

(54) TRANSDUCER ASSEMBLY FOR ELECTRIC PULSE GENERATION

(71) Applicant: GOODRICH CORPORATION, Charlotte, NC (US)

(72) Inventors: Joshua David Carter, Fairfield, CA (US); Jean C. Rodriguez, Vallejo, CA (US)

(73) Assignee: Goodrich Corporation, Charlotte, NC (US)

( * ) Notice: Subject to any disclaimer, the term of this patent is extended or adjusted under 35 U.S.C. 154(b) by 391 days.

(21) Appl. No.: 16/707,993

(22) Filed: Dec. 9, 2019

(65) Prior Publication Data

US 2021/0171208 A1  Jun. 10, 2021

(51) Int. Cl.
*B64D 25/10* (2006.01)
*H02K 33/16* (2006.01)

(52) U.S. Cl.
CPC ............. *B64D 25/10* (2013.01); *H02K 33/16* (2013.01)

(58) Field of Classification Search
CPC ..................................................... B64D 25/10
See application file for complete search history.

(56) References Cited

U.S. PATENT DOCUMENTS

| 3,936,924 A | 2/1976 | Ichise et al. |
| 2015/0247708 A1* | 9/2015 | Skidmore ............... F41H 11/12 89/1.13 |
| 2018/0094504 A1 | 4/2018 | Hearn et al. |
| 2018/0258735 A1* | 9/2018 | Shafer ................... E21B 33/134 |

* cited by examiner

*Primary Examiner* — Richard G Davis
(74) *Attorney, Agent, or Firm* — Snell & Wilmer L.L.P.

(57) ABSTRACT

A transducer assembly configured to convert a pyrotechnic initiation to an electrical signal may comprise a magnet, a hollow tube, and a conductive element. The hollow tube may be wrapped around the magnet in the shape of a coil. The hollow tube may be at least partially filled with a thermite. The conductive element may be coupled to an outlet of the hollow tube. The conductive element may seal the outlet of the hollow tube.

20 Claims, 9 Drawing Sheets

TRANSDUCER ASSEMBLY FOR ELECTRIC PULSE GENERATION

FIELD

The present disclosure relates to electric pulse generation, and more specifically, to a transducer assembly for converting a pyrochemical based signal into an electrical signal.

BACKGROUND

Typical electrical systems utilize a battery to provide current to power electronics. Electronics utilizing an explosive input may utilize a thermal battery that may be initiated by heat to provide a sustained low power current to power electronics. Thermal batteries may be costly and bulky components.

SUMMARY

A transducer assembly is disclosed herein. The transducer assembly may comprise: a magnet; a hollow tube wrapped around the magnet and forming a coil around the magnet, the hollow tube comprising an inlet and an outlet; a thermite disposed in the hollow tube; and a conductive element disposed at the outlet, the conductive element sealing the outlet of the hollow tube.

In various embodiments, the magnet is a permanent magnet. The conductive element may be a wire configured to transmit an electrical signal in response to the thermite undergoing an exothermic reduction-oxidation reaction. The transducer assembly may further comprise an igniter coupled to the inlet of the hollow tube. The transducer assembly may further comprise an igniter disposed proximate the inlet of the hollow tube. The transducer assembly may be configured to convert a pyrotechnic input at the inlet of the hollow tube to an electrical output at the outlet of the hollow tube. The thermite may be configured to form a brief pulse from a peak voltage in response to undergoing an exothermic reduction-oxidation reaction.

An assembly is disclosed herein. The assembly may comprise: an igniter configured to provide a pyrotechnic input; a transducer assembly, comprising: a magnet; a hollow tube wrapped around the magnet and forming a coil around the magnet, the hollow tube comprising an inlet and an outlet, the inlet in communication with the igniter; a thermite disposed in the hollow tube; and a conductive element disposed at the outlet, the conductive element sealing the outlet of the hollow tube.

In various embodiments, the assembly may further comprise an electrical device coupled to the conductive element. The conductive element may be a wire. The transducer assembly may be configured to transmit an electrical signal in response to the thermite undergoing an exothermic reduction-oxidation reaction, the electrical signal configured to be in communication with the electrical device. The electrical signal may be configured to destroy an internal circuitry of the electrical device. The assembly may further comprise a cartridge unit in communication with the igniter. The assembly may further comprise a release mechanism coupled to the conductive element. The release mechanism may be coupled to an ejection seat of an aircraft. The conductive element may be a wire. The transducer assembly may be configured to transmit an electrical signal in response to the thermite undergoing an exothermic reduction-oxidation reaction, the electrical signal configured to provide an electrical time delay to the release mechanism. The assembly may further comprise a cartridge unit in communication with the igniter.

A method of manufacturing a transducer assembly is disclosed herein. The method may comprise: wrapping a hollow tube around a magnet, the hollow tube at least partially filled with a thermite; and coupling a conductive element to an outlet of the hollow tube.

In various embodiments, the method further comprises partially filling the hollow tube with the thermite. The method may further comprise coupling an igniter to an inlet of the hollow tube. The conductive element may be a wire and the magnet may be a permanent magnet The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

A transducer assembly is disclosed herein. The transducer assembly may be configured to convert an explosive input (i.e., a pyrotechnic/explosive form of initiation) to an electrical signal (i.e., a brief pulse on a high peak voltage). The transducer assembly may comprise a magnet, a hollow tube wrapped around the magnet forming a coil, and a conductive element sealing an output end of the hollow tube. The transducer assembly may be configured to receive the explosive input at an input end of the hollow tube and transmit an electrical signal out the conductive element at the output end of the hollow tube. The transducer assembly may be used for anti-tamper applications, retrofitting an explosive input for a rocket assembly to an electrical input for a rocket assembly, or the like. Any application where converting an explosive input into a brief pulse on a high peak voltage is desired is within the scope of this disclosure.

Figure 1A:
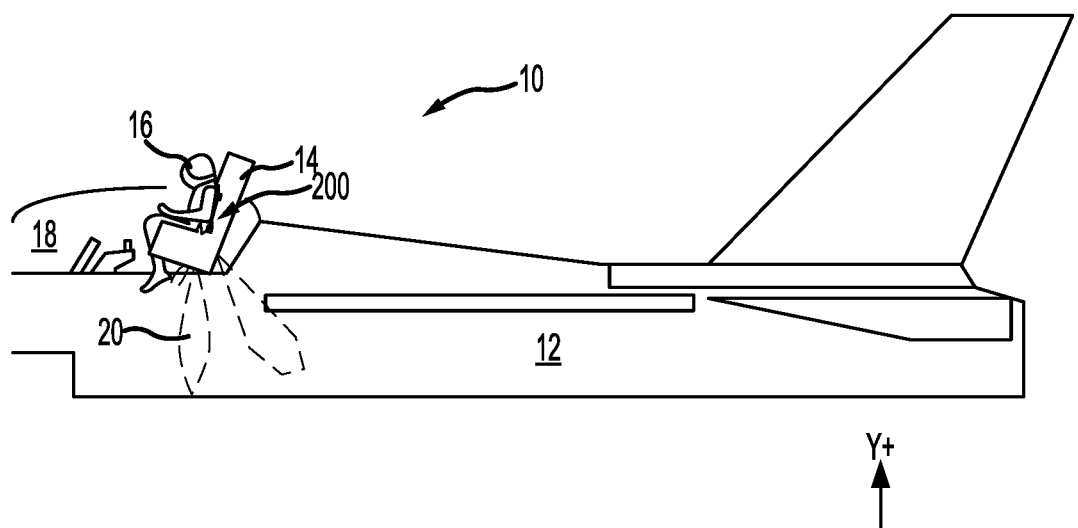
FIG. 1A illustrates an aircraft ejection system, in accordance with various embodiments.

With reference to FIG. 1A, an aircraft ejection system 10 is shown, in accordance with various embodiments. Aircraft ejection system 10 may be installed in aircraft 12 to expel an ejection seat 14 and an occupant 16 of ejection seat 14 from a cockpit 18 of aircraft 12. Ejection seat 14 may be urged from cockpit 18 by a propulsion system 20. In accordance with various embodiments, ejection seat 14 includes rocket catapult assembly 200. Rocket catapult assembly 200 may comprise an element of propulsion system 20 and be configured to extract the ejection seat 14 from cockpit 18.

Figure 1B:
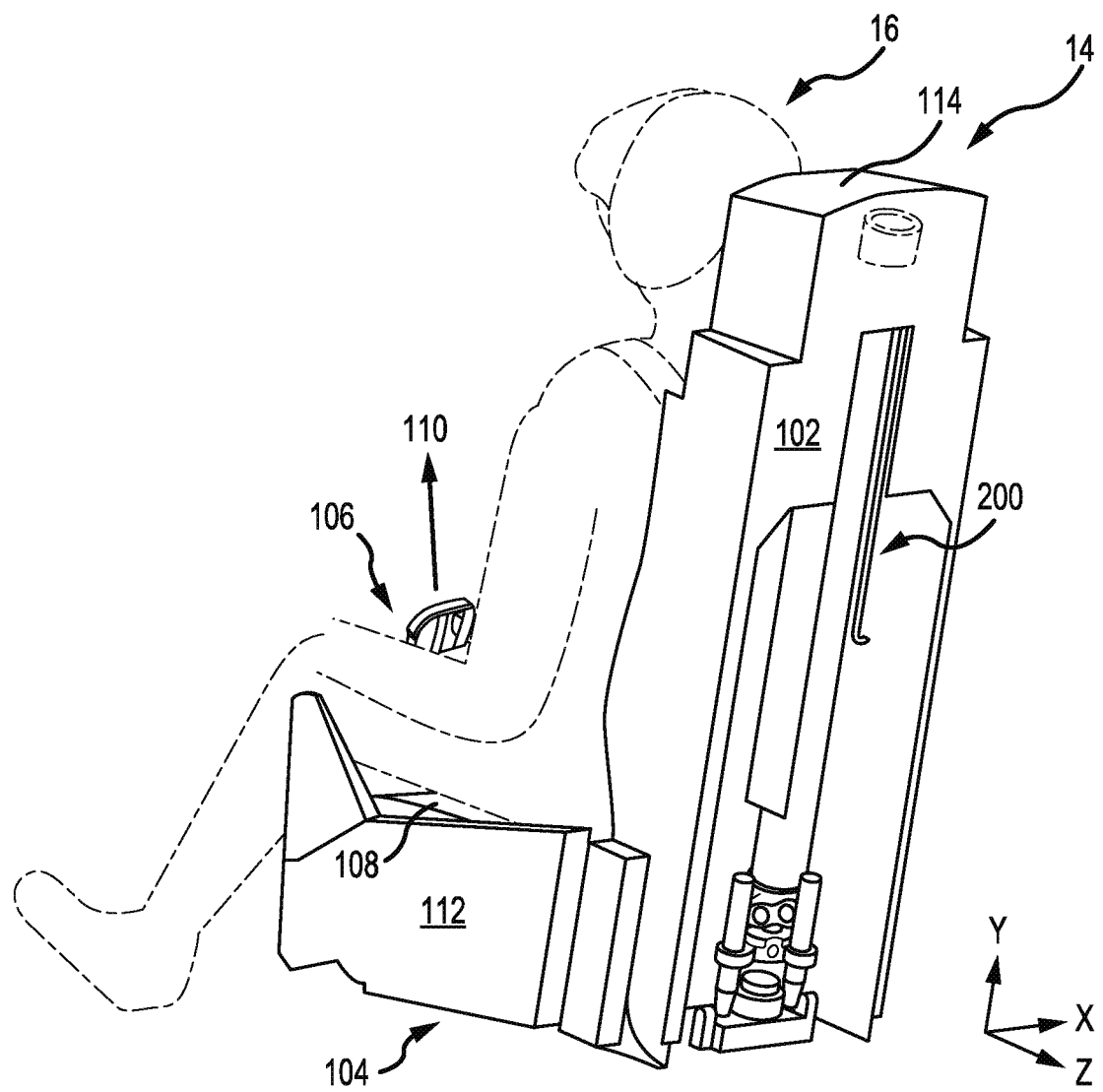
FIG. 1B illustrates an ejection seat having a catapult system in an inactive state, in accordance with various embodiments.

With additional reference to FIG. 1B, ejection seat 14 is illustrated with rocket catapult assembly 200 in an inactive state, in accordance with various embodiments. Ejection seat 14 includes a seat back 102 and a seat pan 104. The rocket catapult assembly 200 is coupled to seat back 102. In various embodiments, an ejection handle 106 may be located proximate a front 108 of seat pan 104. Front 108 of seat pan 104 is generally opposite, or distal, seat back 102. While FIG. 1B shows ejection handle 106 located at front 108 of seat pan 104, it is further contemplated and understood that ejection handle 106 may be located anywhere that is accessible to an occupant of ejection seat 14. For example, ejection handle 106 may be located on a side 112 of seat pan 104 or a headrest 114 of seat back 102.

Figure 2:
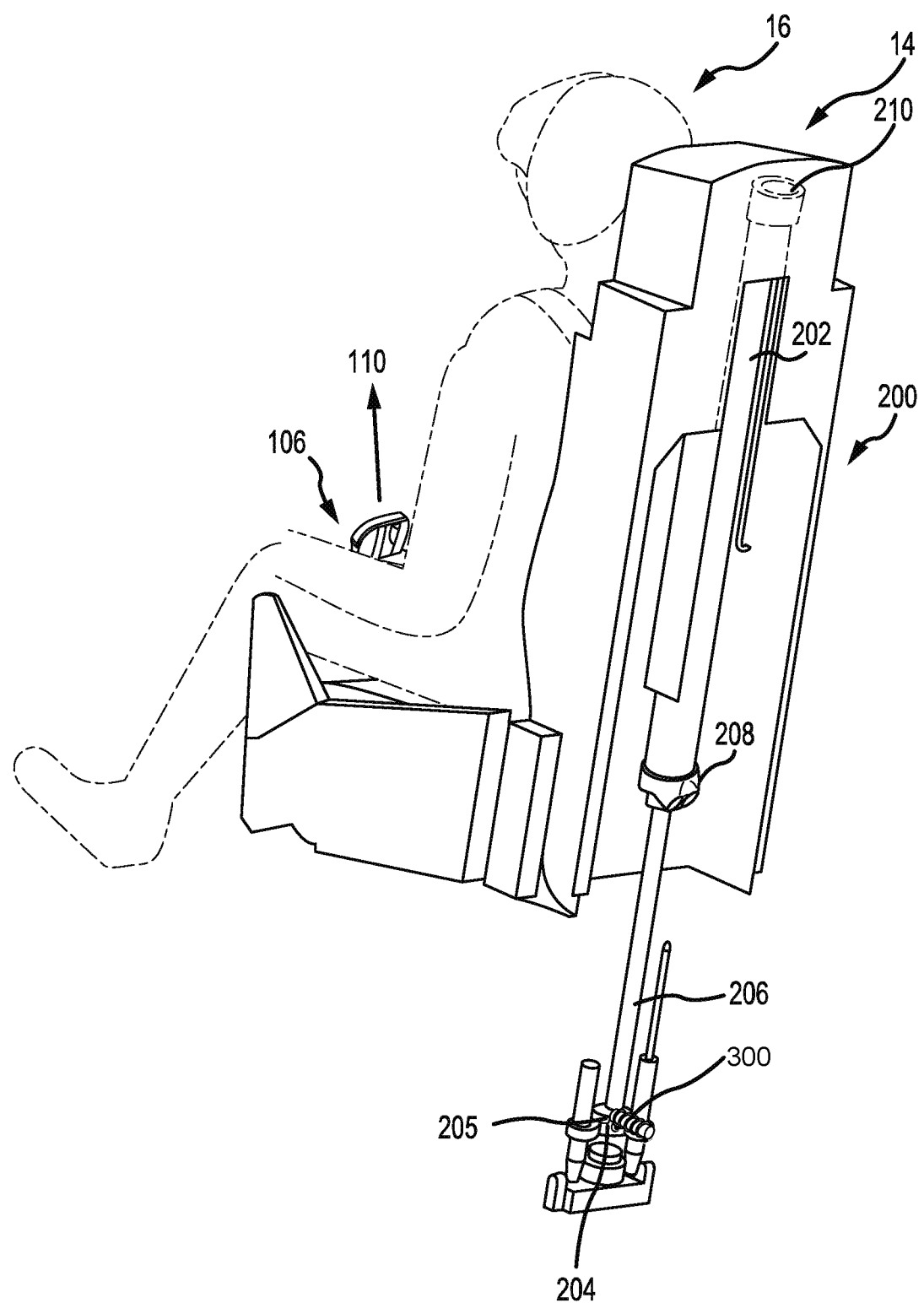
FIG. 2 illustrates an ejection seat having a catapult system in an active state, in accordance with various embodiments.

With additional reference to FIG. 2, ejection seat 14 is illustrated with rocket catapult assembly 200 in an active state, in accordance with various embodiments. Ejection handle 106 may be configured to initiate an ejection sequence upon actuation. For example, occupant 16 pulling ejection handle 106 in the direction of arrow 110 may activate the rocket catapult assembly 200. Rocket catapult assembly 200 may comprise a motor assembly 202, a breach 204, a catapult cartridge unit 205, a nozzle assembly 208, and a motor cap assembly 210. In response to activation, the catapult cartridge unit 205 may ignite and tend to produce relatively hot, high pressure, gas. Breach 204 may be coupled to the aircraft 12 and comprise a mortar tube 206 disposed within the motor assembly 202. In various embodiments, motor cap assembly 210 may direct a first portion of gas to the breach 204 tending thereby to drive the mortar tube 206 outward of the motor assembly 202 and cause ejection seat 14 to be expelled from cockpit 18. In various embodiments, mortar tube 206 may separate from the motor assembly 202 in response to ejection seat 14 departing from the cockpit 18. In various embodiments, the breach 204 may include an integral gas generator which, in response to activation, may drive the mortar tube 206 outward of the motor assembly 202 and cause ejection seat 14 to be expelled from cockpit 18. In various embodiments, the motor assembly 202 may be ignited in response to mortar tube 206 exiting the motor assembly 202.

In various embodiments, the rocket catapult assembly 200 further comprises a transducer assembly 300. Transducer assembly 300 may be in pyrotechnic communication with an igniter. The transducer assembly 300 may be configured to create a time delay and/or convert a pyrotechnic input from the igniter to an electrical input. In various embodiments, cartridge unit 205 is activated by an electrical input. In various embodiments, the transducer assembly 300 may convert the pyrotechnic input from the igniter to an electrical input to activate cartridge unit 205 in response to ejection handle 106 being pulled.

Figure 3:
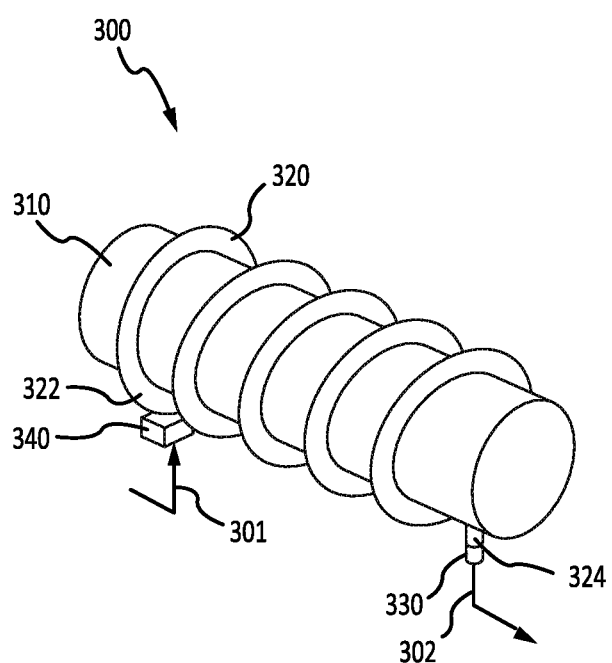
FIG. 3 illustrates a side view of a transducer assembly, in accordance with various embodiments.

Referring now to FIG. 3, a side view of a transducer assembly 300, in accordance with various embodiments, is illustrated. The transducer assembly comprises a magnet 310 (e.g., a permanent magnet), a hollow tube 320, and a conductive element 330. In various embodiments, the hollow tube 320 is wrapped around the magnet 310. For example, hollow tube 320 may be wrapped around the magnet 310 in the form of a coil, a corkscrew, or the like. The hollow tube 320 may comprise an input 322 and an output 324. In various embodiments, conductive element 330 creates a seal at the output 324 of hollow tube 320. In various embodiments, the conductive element 330 is a conductive wire.

In various embodiments, a thermite is disposed within hollow tube 320. A "thermite," as disclosed herein, is any pyrotechnic composition of metal powder and metal oxide. For example, the metal powder may include aluminum, magnesium, titanium, zinc, silicon, boron, or the like, and the metal oxide may include bismuth trioxide, boron trioxide, silicon dioxide, chromium trioxide, manganese oxide, iron(III) oxide, iron(II,III) oxide, copper(II) oxide, lead tetroxide, or the like.

In various embodiments, the hollow tube may be a thin layer explosive (TLX) material, such as an ionomer resin (e.g., such as that sold under the trademark Surlyn® which is available from Dupont of Wilmington Del.), ethylene chlorotrifluoroethylene (e.g., such as that sold under the trademark Halar® which is available from Solvay Solexis, Inc. of West Deptford, N.J.), or the like.

In various embodiments, the input 322 of the hollow tube 320 may be disposed proximate an igniter 340. The input 322 of the hollow tube 320 may be open and disposed proximate the igniter or the input 322 may be coupled, and in communication with, the igniter. The igniter 340 may be any igniter of pyrochemical compositions known in the art (e.g., an electric match, a percussion cap, a heated bridgewire, a bridge resistor, or the like). When the igniter 340 is activated, causing a firing of a mixture of hot gases, and the thermite disposed in the hollow tube 320 is ignited by the heat from the mixture of hot gases, and the thermite undergoes an exothermic reduction-oxidation reaction.

During operation of the transducer assembly 300, a pyrotechnic input signal 301 is initiated by any method known in the art, such as an electrical signal or the like. The pyrotechnic input signal 301 activates the igniter 340, which ignites the thermite disposed in hollow tube 320. Upon ignition the thermite forms a conductive component within the hollow tube 320 in a continuous stream and the reaction propagates through the hollow tube 320, which may be analogous to moving a magnet through a coil of wire to generate a voltage in the wire. As such, the hollow tube 320 filled with a reacting thermite may generate an electrical current in the newly forming wire and the electrical current may propagate to, and transfer to, the conductive element 330 and be carried away as an electrical output signal 302. Transducer assembly 300 allows a pyrotechnic input signal 301 to be converted to an electrical output signal 302.

Figure 4A:
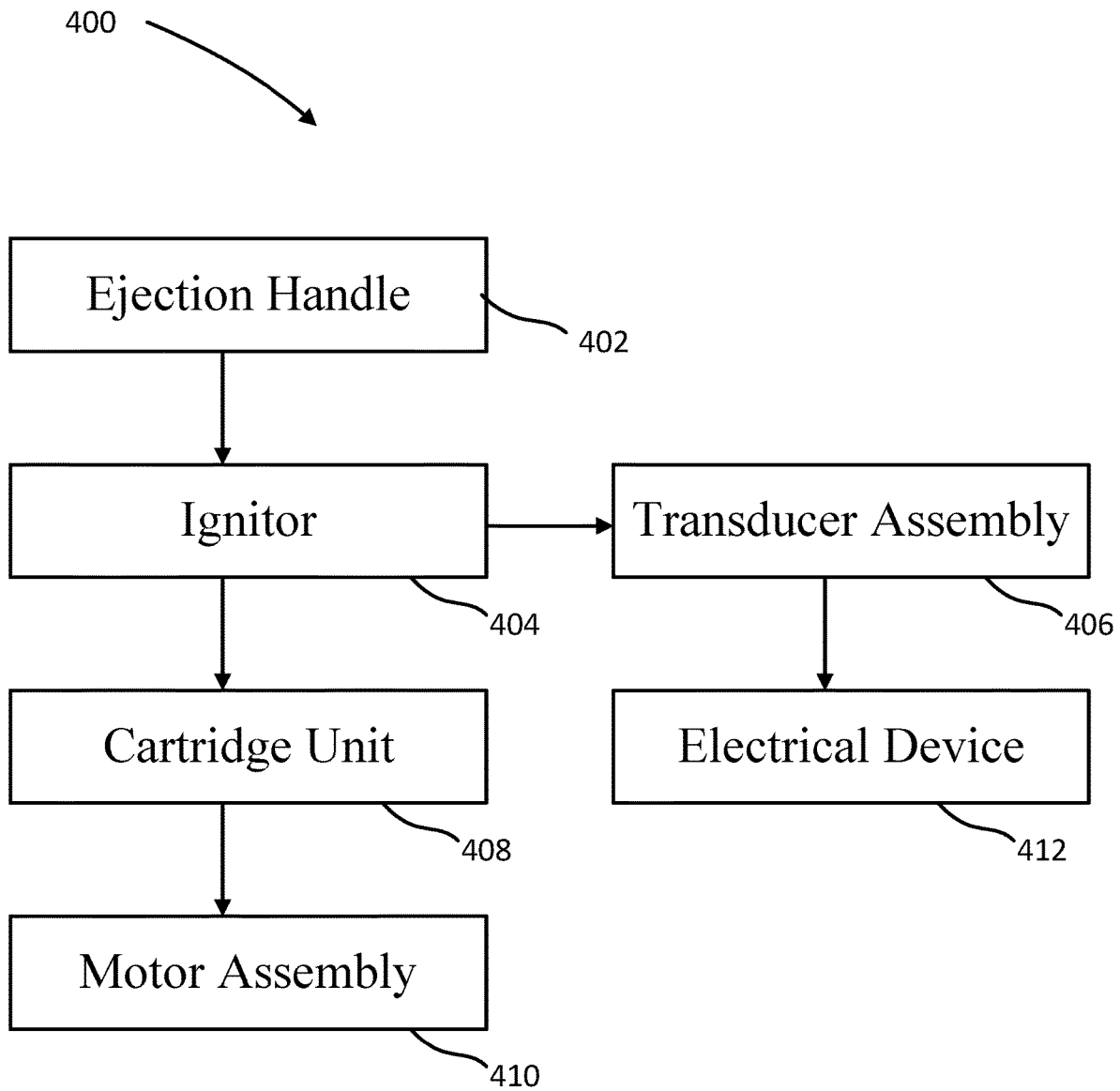
FIG. 4A illustrates a schematic of a transducer assembly for use in an aircraft ejection system, in accordance with various embodiments.
Figure 4B:
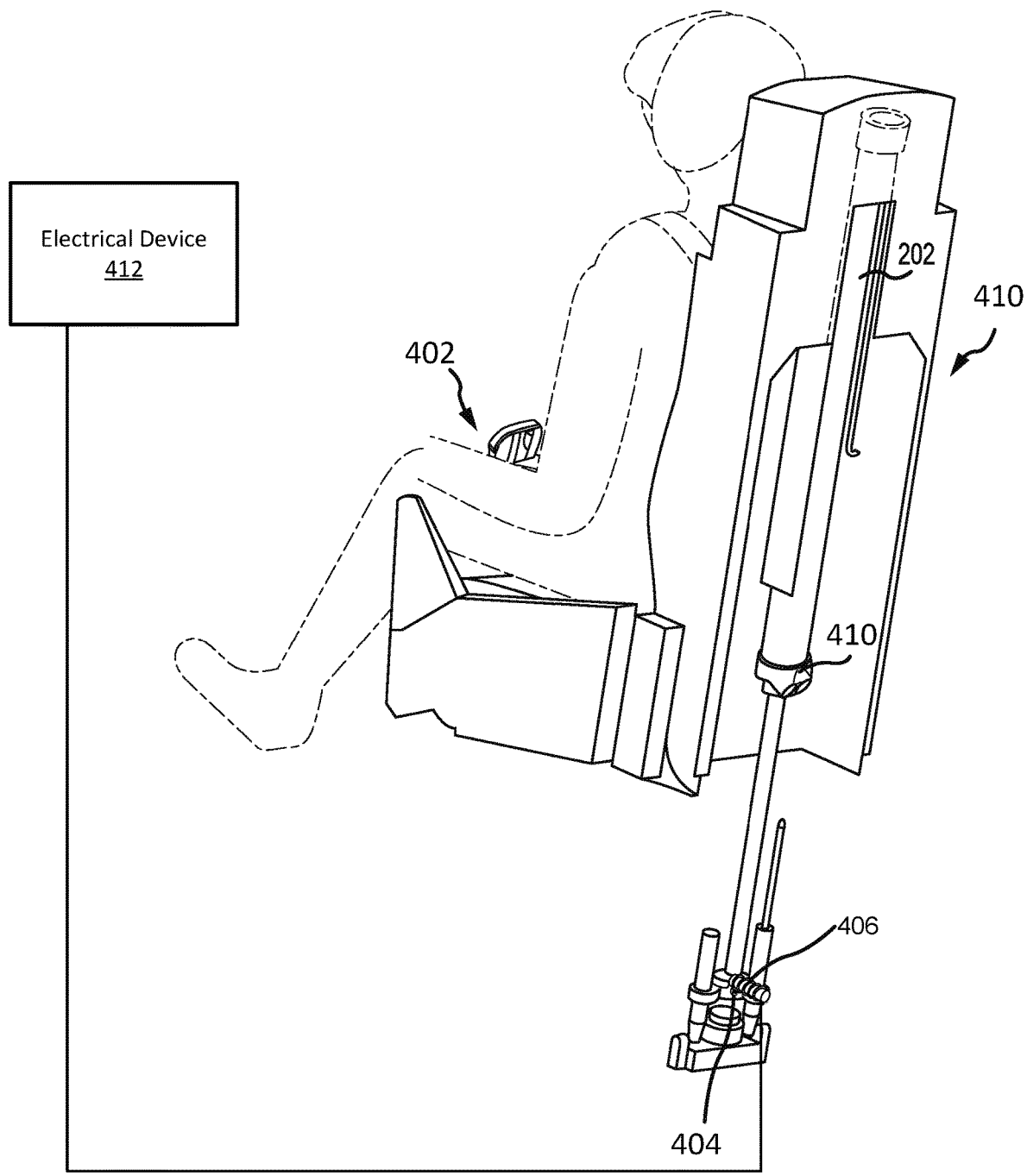
FIG. 4B illustrates a perspective view of a transducer assembly for use in an aircraft ejection system, in accordance with various embodiments.

Referring now to FIGS. 4A and 4B, a schematic view and a perspective view of an anti-tamper assembly 400, in accordance with various embodiments, is illustrated. The anti-tamper assembly 400 may be for use on an aircraft 10 as a part of an ejection system. For example, the anti-tamper assembly may comprise an ejection handle 402 (e.g., ejection handle 110), an igniter 404 (e.g., igniter 340), a transducer assembly 406 (e.g., transducer assembly 300), a cartridge unit 408 (e.g., cartridge unit 205), a motor assembly 410 (e.g., motor assembly 202), and an electrical device 412. In various embodiments, the anti-tamper assembly 400 may be configured to destroy the internal circuitry of the electrical device 412. For example, it may be desirable to destroy sensitive electrical circuits to prevent the potential of reverse engineering when an aircraft is abandoned during flight.

In various embodiments, the ejection handle 402 may be in electrical communication with the igniter 404. The igniter 404 may be any pyrotechnic igniter known in the art. The igniter 404 may be in communication with the transducer assembly 406 and/or the cartridge unit 408. Upon ignition of the igniter 404, the transducer assembly 406 and the cartridge unit 408 may be ignited. In response to activation, the cartridge unit 408 may ignite and tend to produce relatively hot, high pressure, gas and the transducer assembly 406 may ignite the termite disposed in the hollow tube causing the thermite to react and generate an electrical current in the newly forming wire and the electrical current may propagate to, and transfer to, the conductive element of the transducer assembly 406, which is in electrical communication with the electrical device 412.

The electrical device 412 may receive the brief pulse on a high peak voltage. The brief pulse generated from the transducer assembly 406 may be configured to destroy the internal circuitry of the electrical device 412. Simultaneously, the ignition of the cartridge unit 408, which is in communication with the motor assembly 410 may direct a first portion of gas to the breach tending thereby to drive the mortar tube outward of the motor assembly 410 and cause an ejection seat to be expelled from a cockpit.

Figure 5:
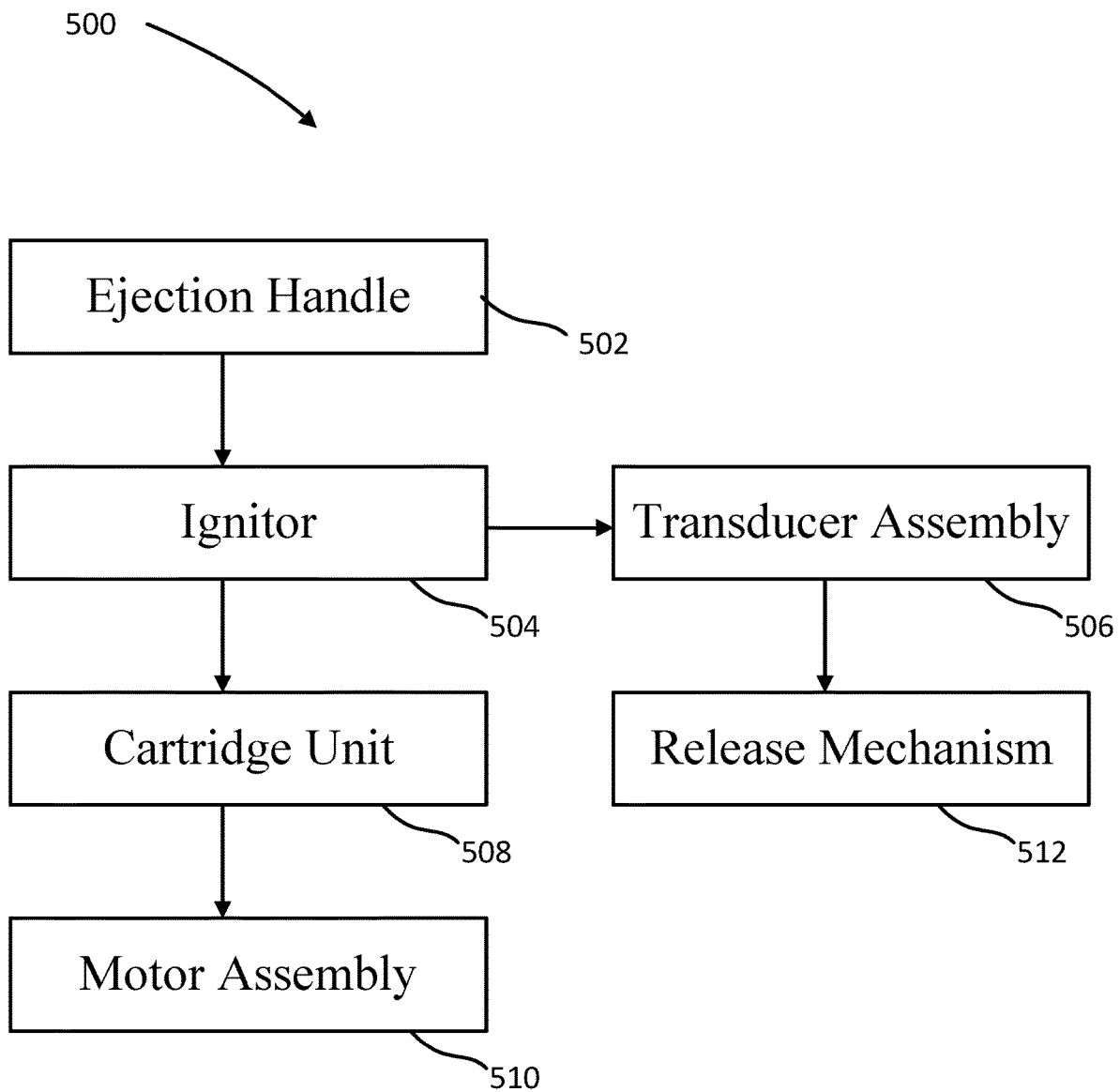
FIG. 5 illustrates a schematic of a transducer assembly for use in an aircraft ejection system, in accordance with various embodiments.

Referring now to FIG. 5, a schematic view of a electrical time delayed evacuation assembly 500, in accordance with various embodiments, is illustrated. The electrical time delayed evacuation assembly 500 may be for use on an aircraft 10 as a part of an ejection system. For example, the electrical time delayed evacuation assembly 500 may comprise an ejection handle 502 (e.g., ejection handle 110), an igniter 504 (e.g., igniter 340), a transducer assembly 506 (e.g., transducer assembly 300), a cartridge unit 508 (e.g., cartridge unit 205), a motor assembly 510 (e.g., motor assembly 202), and a release mechanism 512. In various embodiments, the electronic time delayed evacuation assembly 500 may be configured to transfer an electrical time delayed signal to the release mechanism 512 of an evacuation seat form an aircraft. For example, it may be desirable to utilize a pyrotechnic or explosive input and convert that signal to an electrical time delay signal to release the ejection seat from the aircraft via release mechanism 512.

In various embodiments, the ejection handle 502 may be in electrical communication with the igniter 504. The igniter 504 may be any pyrotechnic igniter known in the art. The igniter 504 may be in communication with the transducer assembly 506 and/or the cartridge unit 508. Upon ignition of the igniter 504, the transducer assembly 506 and the cartridge unit 408 may be ignited. In response to activation, the cartridge unit 508 may ignite and tend to produce relatively hot, high pressure, gas and the transducer assembly 506 may ignite the termite disposed in the hollow tube causing the thermite to react and generate an electrical current in the newly forming wire and the electrical current may propagate to, and transfer to, the conductive element of the transducer assembly 506, which is in electrical communication with the release mechanism 512.

The release mechanism 512 may receive the brief pulse on a high peak voltage. The brief pulse generated from the transducer assembly 506 may be configured to set a time delay of releasing the release mechanism 512 allowing the ejection seat to deploy. Simultaneously, the ignition of the cartridge unit 508, which is in communication with the motor assembly 510 may direct a first portion of gas to the breach tending thereby to drive the mortar tube outward of the motor assembly 510 and cause an ejection seat to be expelled from a cockpit after the time delay.

Figure 6:
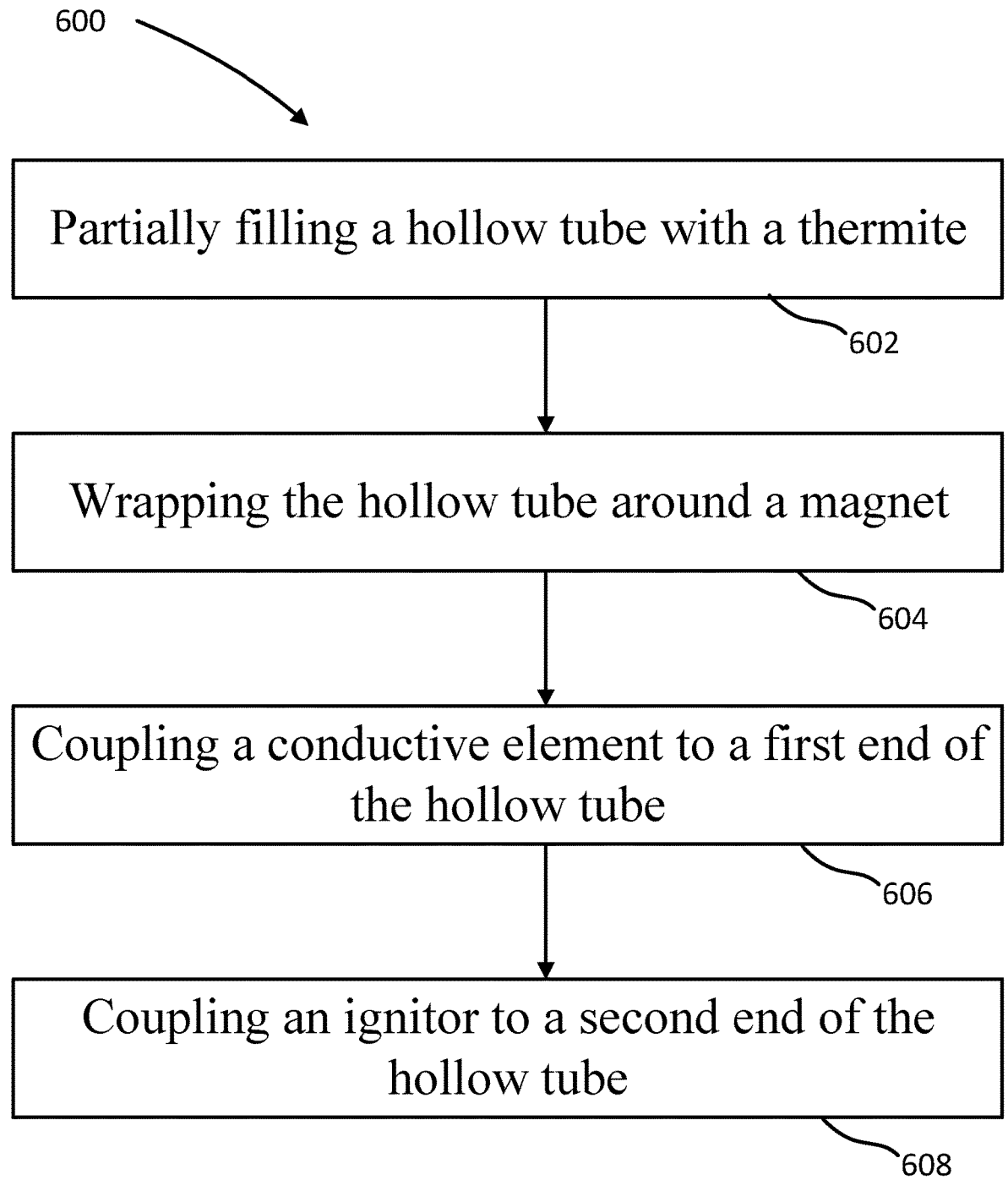
FIG. 6 illustrates a method of manufacturing a transducer assembly, in accordance with various embodiments.

Referring now to FIG. 6, a method 600 of manufacturing a transducer assembly, in accordance with various embodiments, is illustrated. The method 600 may comprise partially filling a hollow tube with a thermite (step 602). The hollow tube may be in accordance with the hollow tube 320 of transducer assembly 300 from FIG. 3. For example, the hollow tube may be a TLX material, such as an ionomer resin, ethylene chlorotrifluoroethylene, or the like. The thermite may be any thermite known in the art. In various embodiments, the thermite may comprise a copper thermite including a copper powder and copper oxide.

The method 600 may further comprise wrapping the hollow tube around a magnet (step 604). In various embodiments, the magnet is a permanent magnet. The hollow tube may be wrapped around the magnet in the shape of a coil, a corkscrew, or the like. The method 600 may further comprise coupling a conductive element to a first end of the hollow tube (step 606). In various embodiments, the first end may be an output end of the hollow tube. The conductive element may be any conductive element known in the art. In various embodiments, the conductive element is copper. The conductive element may create a seal with the first end. The conductive element may be a wire or any other element configured to carry an electrical signal known in the art.

The method 600 may further comprise coupling an igniter to a second end of the hollow tube (step 608). The igniter may be configured to generate an explosive/pyrotechnic ignition and/or to create an exothermic reduction-oxidation reaction of the thermite in the hollow tube.

Figure 7:
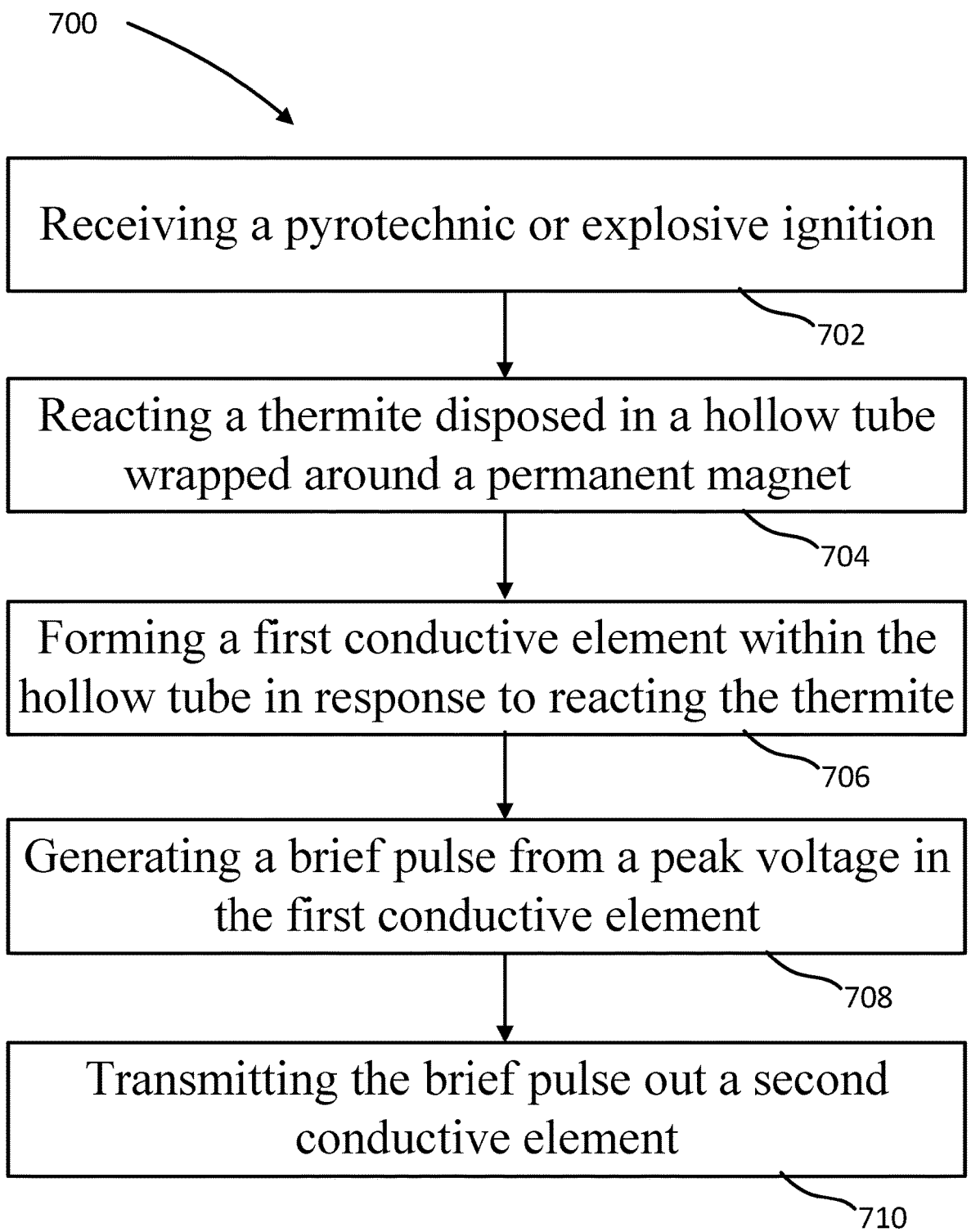
FIG. 7 illustrates a method of converting a pyrochemical signal to an electrical signal, in accordance with various embodiments.

Referring now to FIG. 7, a method 700 of converting a pyrotechnic or explosive input into an electrical signal, in accordance with various embodiments, is illustrated. The method 600 may comprise receiving a pyrotechnic or explosive ignition (step 702). The pyrotechnic or explosive ignition may be any pyrotechnic or explosive ignition known in the art, such as an electric match, a percussion cap, a heated bridgewire, a bridge resistor, or the like. The method 700 may further comprise reacting a thermite disposed in a hollow tube wrapped around a permanent magnet (step 704). The thermite may be any thermite including a metal powder and a metal oxide. In various embodiments, the thermite may comprise a copper powder and a copper(II) oxide.

The method 700 may further comprise forming a first conductive element within the hollow tube in response to reacting the thermite (step 706). The first conductive element may be created by an exothermic reduction-oxidation reaction of the thermite in the hollow tube in response to the pyrotechnic or explosive initiation. The method 700 may further comprise generating a brief pulse from a peak voltage in the first conductive element (step 708). The creation of the brief pulse from the peak voltage may be analogous to moving a magnet through a coil (i.e., the first conductive element is forming around the magnet and generating the brief pulse). The method 700 may further comprise transmitting the brief pulse out a second conductive element (step 710). The second conductive element may be disposed at an output of the hollow tube. In various embodiments, the second conductive element may seal the output of hollow tube, forcing the reaction of the thermite to propagate towards the output of the hollow tube. The second conductive element may be a wire, or any other conductive element known in the art.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A transducer assembly, comprising:
    a magnet;
    a hollow tube wrapped around the magnet and forming a coil around the magnet, the hollow tube comprising an inlet and an outlet;
    a thermite disposed in the hollow tube; and
    a conductive element disposed at the outlet, the conductive element sealing the outlet of the hollow tube.

2. The transducer assembly of claim 1, wherein the magnet is a permanent magnet.

3. The transducer assembly of claim 1, wherein the conductive element is a wire configured to transmit an electrical signal in response to the thermite undergoing an exothermic reduction-oxidation reaction.

4. The transducer assembly of claim 1, further comprising an igniter coupled to the inlet of the hollow tube.

5. The transducer assembly of claim 1, further comprising an igniter disposed proximate the inlet of the hollow tube.

6. The transducer assembly of claim 1, wherein the transducer assembly is configured to convert a pyrotechnic input at the inlet of the hollow tube to an electrical output at the outlet of the hollow tube.

7. The transducer assembly of claim 1, wherein the thermite is configured to form a brief pulse from a peak voltage in response to undergoing an exothermic reduction-oxidation reaction.

8. An assembly, comprising:
    an igniter configured to provide a pyrotechnic input;
    a transducer assembly, comprising:
        a magnet;
        a hollow tube wrapped around the magnet and forming a coil around the magnet, the hollow tube comprising an inlet and an outlet, the inlet in communication with the igniter;
        a thermite disposed in the hollow tube; and
        a conductive element disposed at the outlet, the conductive element sealing the outlet of the hollow tube.

9. The assembly of claim 8, further comprising an electrical device coupled to the conductive element.

10. The assembly of claim 9, wherein the conductive element is a wire, and wherein the transducer assembly is configured to transmit an electrical signal in response to the thermite undergoing an exothermic reduction-oxidation reaction, the electrical signal configured to be in communication with the electrical device.

11. The assembly of claim 10, wherein the electrical signal is configured to destroy an internal circuitry of the electrical device.

12. The assembly of claim 10, further comprising a cartridge unit in communication with the igniter.

13. The assembly of claim 8, further comprising a release mechanism coupled to the conductive element.

14. The assembly of claim 13, wherein the release mechanism is coupled to an ejection seat of an aircraft.

15. The assembly of claim 13, wherein the conductive element is a wire, and wherein the transducer assembly is configured to transmit an electrical signal in response to the thermite undergoing an exothermic reduction-oxidation reaction, the electrical signal configured to provide an electrical time delay to the release mechanism.

16. The assembly of claim 13, further comprising a cartridge unit in communication with the igniter.

17. A method of manufacturing a transducer assembly, the method comprising:
   wrapping a hollow tube around a magnet, the hollow tube at least partially filled with a thermite; and
   coupling a conductive element to an outlet of the hollow tube.

18. The method of claim 17, further comprising partially filling the hollow tube with the thermite.

19. The method of claim 17, further comprising coupling an igniter to an inlet of the hollow tube.

20. The method of claim 17, wherein the conductive element is a wire, and wherein the magnet is a permanent magnet.

* * * * *